(12) United States Patent
Kurian

(10) Patent No.: US 11,800,314 B2
(45) Date of Patent: Oct. 24, 2023

(54) INTERLINKED GEO-FENCING

(71) Applicant: Bank of America Corporation, Charlotte, NC (US)

(72) Inventor: Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/176,286

(22) Filed: Feb. 16, 2021

(65) Prior Publication Data

US 2021/0185476 A1 Jun. 17, 2021

Related U.S. Application Data

(63) Continuation of application No. 16/380,264, filed on Apr. 10, 2019, now Pat. No. 10,952,015.

(51) Int. Cl.
| | |
|---|---|
| *H04W 4/021* | (2018.01) |
| *H04W 4/02* | (2018.01) |
| *H04W 60/00* | (2009.01) |
| *H04W 64/00* | (2009.01) |
| *H04W 40/24* | (2009.01) |
| *H04W 12/06* | (2021.01) |

(52) U.S. Cl.
CPC .......... *H04W 4/021* (2013.01); *H04W 4/025* (2013.01); *H04W 12/06* (2013.01); *H04W 40/244* (2013.01); *H04W 60/00* (2013.01); *H04W 64/003* (2013.01)

(58) Field of Classification Search
CPC ..... H04W 4/021; H04W 4/029; H04W 12/08; H04W 4/02; H04W 4/027; H04W 4/38; H04W 12/06; H04W 12/086; H04W 12/63; H04W 4/022; H04W 4/023; H04W 4/025; H04W 4/80; H04W 72/048; H04W 12/03; H04W 84/12; H04W 12/0471; H04W 12/068; H04W 12/65; H04W 4/33; H04W 4/40; H04W 4/44; H04W 52/0209; H04W 64/00; H04W 84/042
See application file for complete search history.

(56) References Cited

U.S. PATENT DOCUMENTS

| | | |
|---|---|---|
| 8,325,025 B2 | 12/2012 | Morgan et al. |
| 8,508,349 B2 | 8/2013 | Morgan et al. |
| 8,581,713 B1 | 11/2013 | Morgan et al. |
| 8,686,841 B2 | 4/2014 | Macheca et al. |
| 9,037,111 B2 | 5/2015 | West |

(Continued)

*Primary Examiner* — Kwasi Karikari
(74) *Attorney, Agent, or Firm* — Banner & Witcoff, Ltd.

(57) ABSTRACT

Arrangements for generating geo-fences for automatically authenticating a user or authorizing event processing are provided. In some examples, user data associated with a location of the user or mobile device of the user may be received. Further, data associated with successful processing of an event may be received. In some arrangements, this data may be used to generate a first geo-fence. The geo-fenced area may be considered a trusted zone within which a user may be automatically authenticated and/or events may be automatically authorized and/or processed. In some examples, additional user data may be received and analyzed using machine learning to predict second or subsequent geo-fence locations. Based on the analyzed data, one or more additional geo-fences or geo-fenced areas may be generated and interlinked with the initial geo-fence.

21 Claims, 13 Drawing Sheets

(56) References Cited

U.S. PATENT DOCUMENTS

| | | |
|---|---|---|
| 9,380,421 B1 | 6/2016 | Vltavsky |
| 9,439,035 B2 | 9/2016 | Fraccaroli |
| 9,560,481 B1 * | 1/2017 | Yocam .................. H04W 4/021 |
| 9,781,602 B1 | 10/2017 | Girdhar et al. |
| 9,820,231 B2 | 11/2017 | Gorgenyi et al. |
| 9,894,478 B1 | 2/2018 | DeLuca et al. |
| 9,924,315 B1 | 3/2018 | Cornwall et al. |
| 9,934,249 B2 | 4/2018 | Tripathi et al. |
| 9,961,088 B2 | 5/2018 | Hughes, Jr. et al. |
| 9,998,457 B1 | 6/2018 | Barillaud et al. |
| 10,026,073 B2 | 7/2018 | Moshfeghi |
| 10,075,812 B1 | 9/2018 | DeLuca et al. |
| 2010/0145947 A1 | 6/2010 | Kolman et al. |
| 2013/0238366 A1 * | 9/2013 | Morgan ................ B60R 25/102 |
| | | 705/4 |
| 2014/0031011 A1 * | 1/2014 | West .................. G06F 21/6272 |
| | | 455/411 |
| 2014/0162692 A1 * | 6/2014 | Li ........................ H04L 67/306 |
| | | 455/456.3 |
| 2015/0121464 A1 * | 4/2015 | Hughes, Jr. ............. H04L 63/08 |
| | | 726/4 |
| 2015/0163629 A1 * | 6/2015 | Cheung ................ H04W 4/022 |
| | | 455/456.1 |
| 2016/0150367 A1 | 5/2016 | Anand et al. |
| 2017/0118025 A1 | 4/2017 | Shastri et al. |
| 2018/0113780 A1 | 4/2018 | Kim et al. |
| 2018/0202821 A1 | 7/2018 | Yu et al. |
| 2019/0045331 A1 | 2/2019 | Liang et al. |
| 2019/0261131 A1 * | 8/2019 | Keil ....................... H04W 68/04 |
| 2020/0119973 A1 | 4/2020 | Dziduch et al. |
| 2020/0151621 A1 | 5/2020 | Garcia Delgado et al. |

* cited by examiner

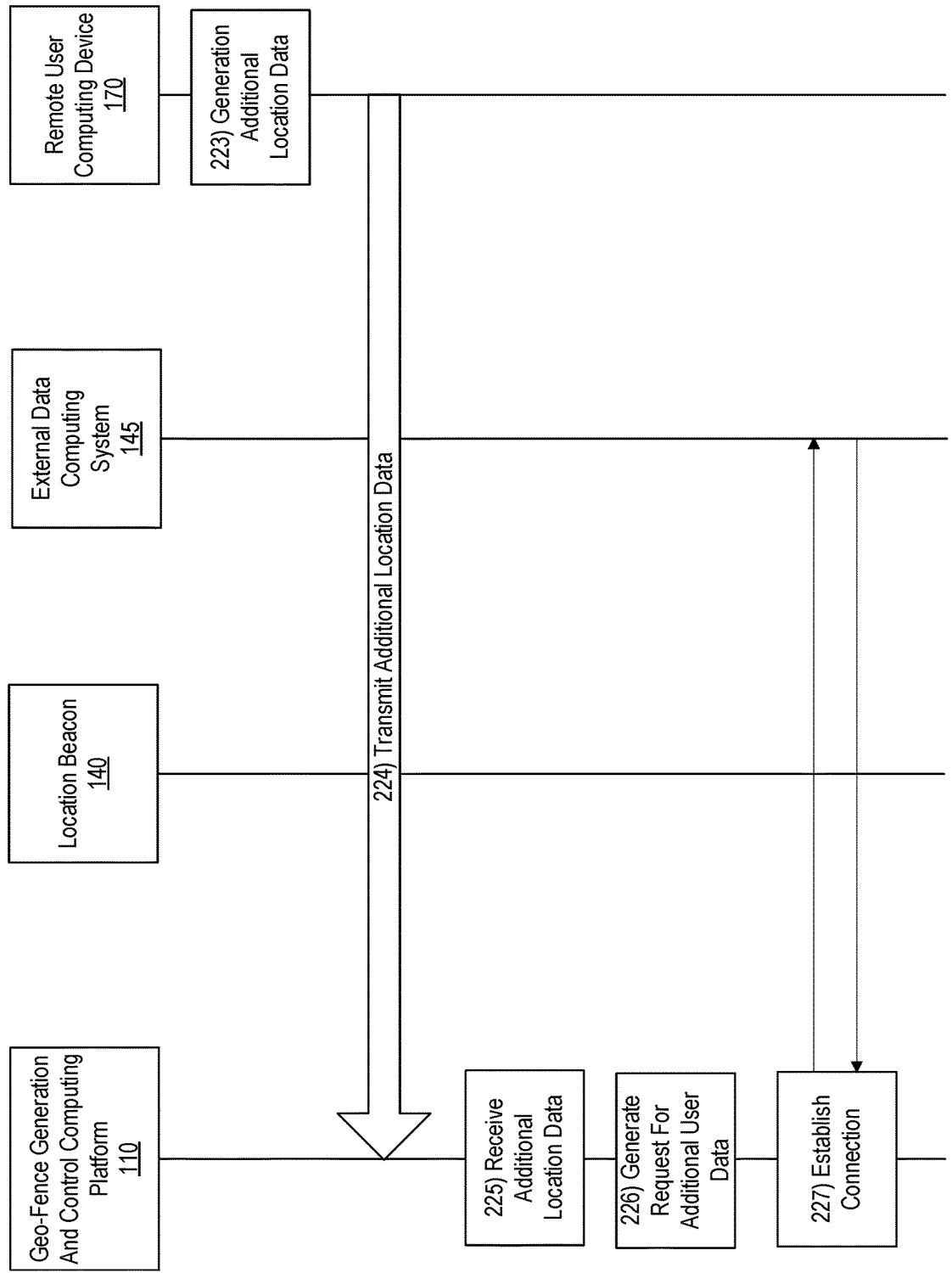

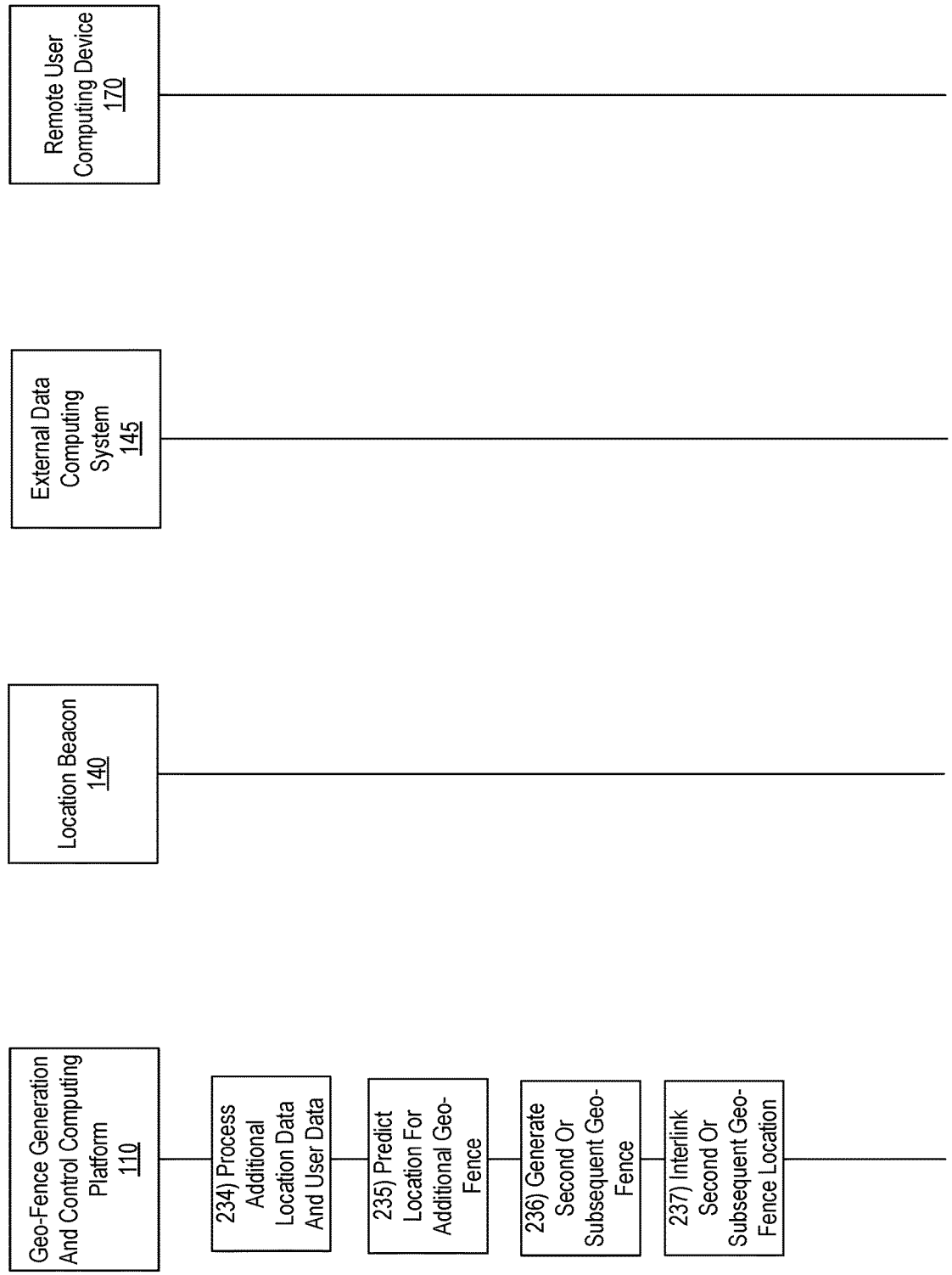

INTERLINKED GEO-FENCING

CROSS REFERENCE TO RELATED APPLICATIONS

This application is a continuation of and claims priority to co-pending U.S. application Ser. No. 16/380,264, filed Apr. 10, 2019 and entitled "Interlinked Geo-Fencing," which is incorporated herein by reference in its entirety.

BACKGROUND

Aspects of the disclosure relate to electrical computers, systems, and devices for authentication and authorization. In particular, one or more aspects of the disclosure relate to generated one or more interlinked geo-fenced areas to authenticate a user, authorize event processing, and the like.

Protecting user data, personal finances, and thwarting unauthorized activity are priorities for users today. As traditional methods of authentication and event authorization become increasingly cumbersome and less reliable, technology is being used to generate new methods of authentication and event processing.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with authenticating users and/or authorizing event processing.

In some examples, user data may be received. For instance, user data associated with movement or location of the user (e.g., based on data from one or more sensors in a mobile device of the user) may be received. Further, trusted event processing data may be received. For instance, data associated with successful processing of an event may be received. In some arrangements, this data may be used to generate a first geo-fence or geo-fenced area. The geo-fence or geo-fenced area may be considered a trusted zone within which a user may be automatically authenticated and/or events may be automatically authorized and/or processed.

In some examples, subsequent location data may be received from, for example, a mobile device of the user. For instance, global positioning system (GPS) data may be received from the mobile device. The subsequent location data may be analyzed to determine whether the subsequent location is within the generated geo-fenced area. If so, the user may be authenticated and/or the event may be processed. If not, traditional authentication and authorization may be used.

In some examples, additional user data may be received and analyzed using machine learning to predict second or subsequent geo-fence locations. Based on the analyzed data, one or more additional geo-fences or geo-fenced areas may be generated and interlinked with the initial geo-fence.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence for implementing geo-fence generation and control functions in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to geo-fence generation and control to enable automatic authentication of users, authorization of event processing, and the like.

As mentioned above, protecting user data, user payment devices, and the like, is a top priority for many people. As traditional or conventional methods of authentication and authorization become less secure and more cumbersome, it is advantageous to use methods of authentication and authorization that are less susceptible to access by unauthorized users.

Accordingly, aspects described herein are directed to generating and controlling one or more geo-fences to create geo-fenced areas representing trusted zones. Within the geo-fenced area(s) a user may be automatically authenticated, events may be automatically authorized and/or processed, and the like.

In some examples, an initial geo-fence may be generated based on user location data, trusted event processing data, and the like. In some arrangements, a user may request generation of a geo-fence. After a geo-fence is generated, upon detection of the user within a geo-fenced area, the user may be automatically authenticated, requested events may be automatically authorized or processed, and the like.

In some examples, machine learning may be used to generate second or subsequent geo-fences. For instance, user data may be received and analyzed to predict one or more locations for one or more subsequent geo-fences. Based on the predictions, additional geo-fences may be generated.

These and various other arrangements will be discussed more fully below.

Figure 1A:
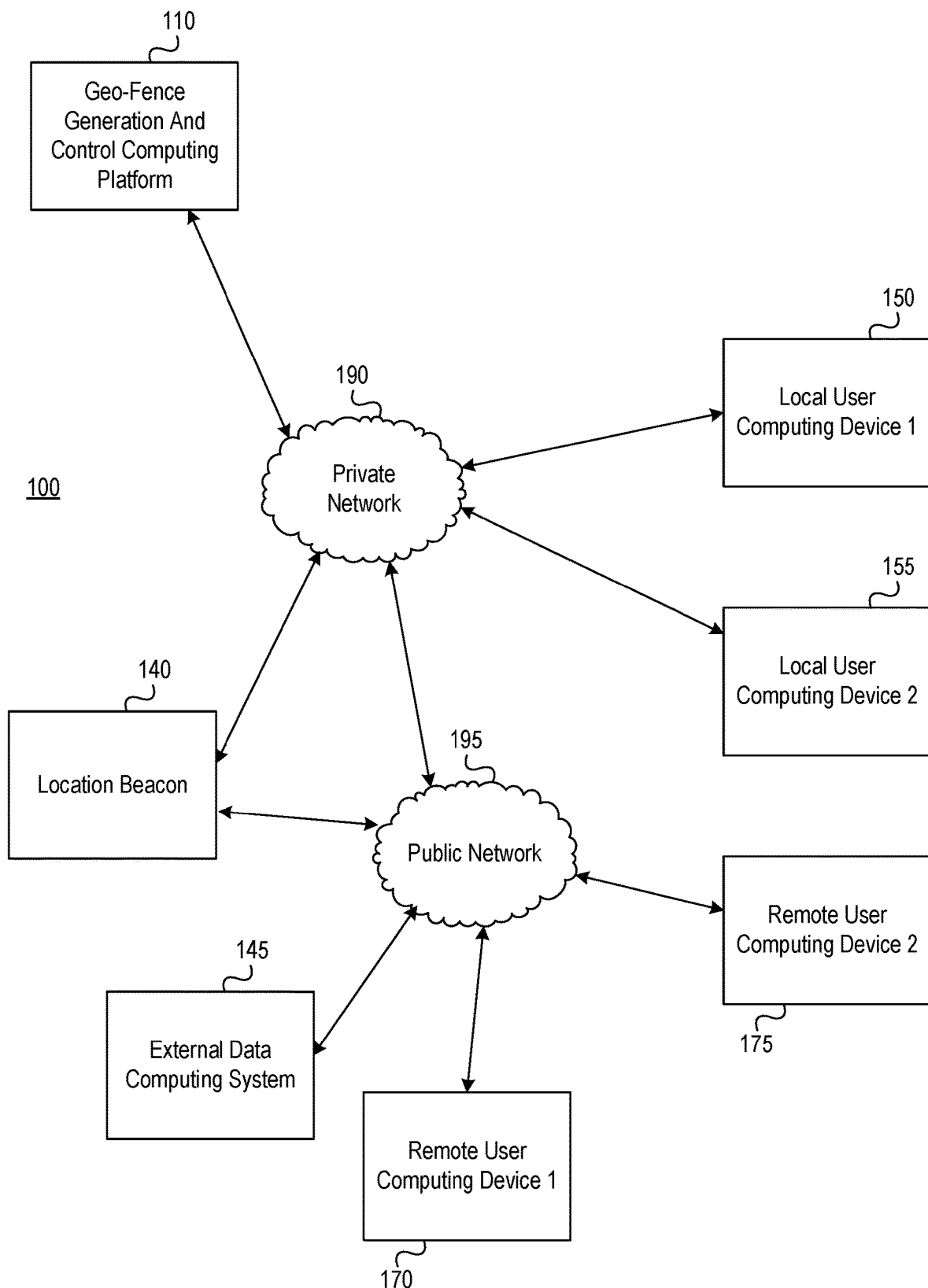
FIGS. 1A and 1B depict an illustrative computing environment for implementing geo-fence generation and control functions in accordance with one or more aspects described herein.
Figure 1B:
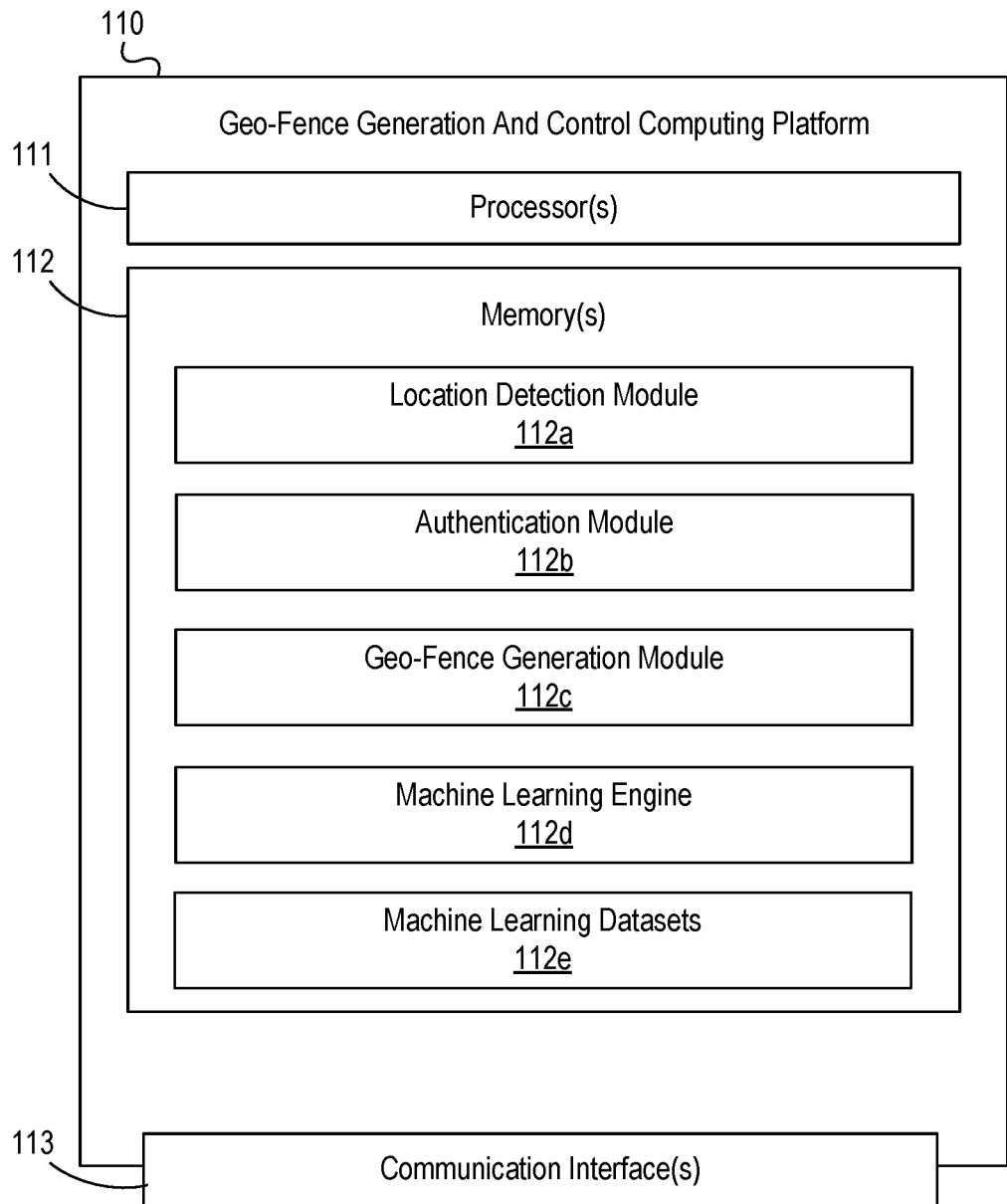

FIGS. 1A and 1B depict an illustrative computing environment for implementing and using a system for geo-fence generation and control functions in accordance with one or more aspects described herein. Referring to FIG. 1A, computing environment 100 may include one or more computing devices and/or other computing systems. For example, computing environment 100 may include geo-fence generation and control computing platform 110, location beacon 140, external data computing system 145, a first local user computing device 150, a second local user computing device 155, a first remote user computing device 170, and a second remote user computing device 175.

Geo-fence generation and control computing platform 110 may be configured to provide intelligent, dynamic control and generation of geo-fences that may be used to authenticate a user, authorize processing of an event, and the like. For instance, user location data may be received and analyzed to determine one or more locations visited by the user, frequency of visits, whether one or more events were processed at a location, and the like. In some examples, this information may be received from, for example, a mobile device of a user, such as a smartphone, wearable device, fitness tracker, smart watch, tablet computer, laptop computer, or the like. The data may be store as it is received. In some examples, if an event is successfully processed at a location (e.g., a trusted event is processed), the location may be flagged for geo-fencing and a first geo-fence may be generated. The geo-fence may use global positioning system (GPS) data and/or radio frequency identification (RFID) to establish the virtual boundary of the geo-fence. Accordingly, upon detecting the mobile device of the user within the generated virtual boundary of the geo-fence, the system may automatically authenticate the user, authorize processing of one or more events, and the like (e.g., without additional user interaction).

In some examples, machine learning may be used to generate one or more additional geo-fences that may be interlinked to the first generated geo-fence. For example, data associated with a user may be received from one or more sources, such as external data computing system 145, local user computing device 170, local user computing device 175, or other internal or external sources. The data may include purchase history, internet browsing history, demographic information, previously stored location or movement data (e.g., GPS data from a mobile device of the user), and the like. The data may be received and processed, with appropriate permission of the user, using machine learning to predict other locations at which a trusted event may be processed and generate a second geo-fence at the predicted other location(s). For instance, if a user visits a first retail establishment every (or nearly every) Saturday morning, a first geo-fence may be generated for the first retail establishment. Based on purchase history, location data history, or the like, of the user at a second retail establishment within a predetermined distance of the first retail establishment (e.g., within a certain number of feet, yards, miles, or the like), that occurs occasionally on Saturdays after a purchase at the first retail establishment, the system may generate a second geo-fence for the second retail establishment. Accordingly, the user may be automatically authenticated and/or one or more events may be automatically authorized and processed based on subsequent detection of the user mobile device within the second geo-fence. Accordingly, while the initial geo-fence may be based on actual user processing of one or more trusted events at a first location, one or more subsequently generated geo-fences may be generated based on historical data and/or without a user processing one or more events at the second location.

In some examples, trusted events may include purchases or other transactions. In some examples, the transaction or other trusted event may be processed using, for example, an online payment service, a payment application executing on a mobile device of a user, or the like linked to one or more accounts (e.g., checking account, savings account, credit card account, store account, or the like) of the user. Accordingly, in at least some examples, the automatically authorized events may be authorized and trusted events processed without the user of a physical card or other payment device.

In some examples, generated geo-fences may be customizable to enable a user to activate/deactivate a geo-fence, modify a size or shape of a geo-fence, and the like.

Computing environment 100 also may include one or more location beacons, such as location beacon 140. Although only one location beacon is shown in FIG. 1A, two or more location beacons may be used without departing from the invention. Each location beacon (e.g., location beacon 140) may be configured to transmit one or more radio signals that may be detected and/or received by other devices located in close proximity of and/or otherwise within a predetermined distance of the particular location beacon. In one or more embodiments, any and/or all of the location beacons included in computing environment 100 (e.g., location beacon 140) may implement Bluetooth Low Energy (also referred to as "Bluetooth LE," "Bluetooth Smart," or "BLE") technology to transmit low-power radio signals. The particular signal(s) transmitted by a particular location beacon may include one or more attributes, such as a unique identifier assigned to and/or otherwise associated with the particular location beacon, that may enable the particular location beacon to be identified by a device receiving the particular signal(s) transmitted by the particular location beacon. As illustrated below, by detecting a particular signal transmitted by a location beacon (which may, e.g., be positioned at a specific location) and subsequently identifying the location beacon transmitting the particular signal, a computing device may be able to determine that it is located at and/or near the specific location where the location beacon is positioned.

For example, in one or more arrangements discussed below, the one or more location beacons (e.g., location beacon 140) may be positioned at and/or near a retail establishment, a school, a place of business, a secure area, or the like. In addition, each location beacon may transmit a radio signal that may be detected and/or received by other, such as remote user computing device 170, remote user computing device 175, or the like, which may enable such devices to determine that they are present at or near the location of the location beacon 140.

Computing environment 100 may further include an external data computing system 145. External data computing system 145 may include one or more computing systems or devices arranged at or associated with one or more entities other than (e.g., external to) the entity implementing the geo-fence generation and control computing platform 110. In some examples, the external data computing system 145 may be a computing system storing data associated with a user (e.g., purchase history data, event processing data, and the like). Additionally or alternatively, the external data computing system 145 may include a radio frequency identification (RFID) system configured to detect a RFID tag associated with a user at a particular location. For instance, RFID may be used to detect a presence of a user at or near a secure area. The user may have an active or passive RFID tag that may be associated with the user's mobile device or may be separate from the mobile device. Upon detection of the user at the secure location, if the user is provided access to the secure location via RFID at least a threshold number of times, a geo-fence may be generated at the secure location and, upon detecting the user (e.g., via mobile device, GPS, RFID, or the like), the user may be automatically authenticated and provided access to the secure area (e.g., without requiring the RFID tag to be within a certain proximity of the RFID reader in the RFID system).

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the geo-fence generation and control computing platform 110 to control parameters of the system, update or execute rules, modify settings, display notifications, and the like. Additionally or alternatively, local user computing device 150, 155 store user information based on records internal to the entity implementing the geo-fence generation and control computing platform 110.

The remote user computing devices 170, 175 may be used to communicate with, for example, geo-fence generation and control computing platform 110. For instance, remote user computing devices 170, 175 may include user computing devices, such as mobile devices including smartphones, tablets, laptop computers, wearable devices, point-of-sale systems, and the like, that may be used to communicate with geo-fence generation and control computing platform 110, receive instructions or signals related to a requested event, process or deny processing of an event, capture and store location (e.g., GPS) information, transmit information to other devices, and the like.

In one or more arrangements, external data computing system 145, local user computing device 150, local user computing device 155, remote user computing device 170, and/or remote user computing device 175 may be any type of computing device or combination of devices configured to perform the particular functions described herein. For example, external data computing system 145, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of external data computing system 145, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include geo-fence generation and control computing platform 110. As illustrated in greater detail below, geo-fence generation and control computing platform 110 may include one or more computing devices configured to perform one or more of the functions described herein. For example, geo-fence generation and control computing platform 110 may include one or more computers (e.g., laptop computers, desktop computers, servers, server blades, or the like).

As mentioned above, computing environment 100 also may include one or more networks, which may interconnect one or more of geo-fence generation and control computing platform 110, location beacon 140, external data computing system 145, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, geo-fence generation and control computing platform 110, location beacon 140, local user computing device 150, local user computing device 155, and, may be associated with an organization (e.g., a financial institution), and private network 190 may be associated with and/or operated by the organization, and may include one or more networks (e.g., LANs, WANs, virtual private networks (VPNs), or the like) that interconnect geo-fence generation and control computing platform 110, location beacon 140, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., geo-fence generation and control computing platform 110, location beacon 140, local user computing device 150, local user computing device 155) with one or more networks and/or computing devices that are not associated with the organization. For example, external data computing system 145, location beacon 140, remote user computing device 170, remote user computing device 175, might not be associated with an organization that operates private network 190 (e.g., because location beacon 140, external data computing system 145, remote user computing device 170, remote user computing device 175, may be owned, operated, and/or serviced by one or more entities different from the organization that operates private network 190, such as a second entity different from the entity, one or more customers of the organization, public or government entities, and/or vendors of the organization, rather than being owned and/or operated by the organization itself or an employee or affiliate of the organization), and public network 195 may include one or more networks (e.g., the internet) that connect location beacon 140, external data computing system 145, remote user computing device 170, remote user computing device 175, to private network 190 and/or one or more computing devices connected thereto (e.g., geo-fence generation and control computing platform 110, location beacon 140, local user computing device 150, local user computing device 155).

Referring to FIG. 1B, geo-fence generation and control computing platform 110 may include one or more processors 111, memory 112, and communication interface 113. A data bus may interconnect processor(s) 111, memory 112, and communication interface 113. Communication interface 113 may be a network interface configured to support communication between geo-fence generation and control computing platform 110 and one or more networks (e.g., private network 190, public network 195, or the like). Memory 112 may include one or more program modules having instructions that when executed by processor(s) 111 cause geo-fence generation and control computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of geo-fence generation and control computing platform 110 and/or by different computing devices that may form and/or otherwise make up geo-fence generation and control computing platform 110.

For example, memory 112 may have, store and/or include a location detection module 112a. Location detection module 112a may store instructions and/or data that may cause or enable the geo-fence generation and control computing platform 110 to detect a location of a user. For instance, GPS data may be received from a mobile device of a user (e.g., remote user computing device 170, remote user computing device 175) indicating a location of a user (e.g., longitude and latitude, other location information, or the like). In some examples, location detection module 112a may receive a signal from one or more location beacons, such as location beacon 140 or may receive a signal from the mobile device of the user (e.g., remote user computing device 170, remote user computing device 175) indicating that the mobile device detected a signal emitted from the location beacon. Upon receiving the signal from the location beacon 140 or indication that the signal was detected, the geo-fence generation and control computing platform 110 may detect a location of the user based on a predefined location associated with the location beacon 140 and the indication that the mobile device was within a predefined proximity of the location beacon 140 (e.g., was close enough to detect the signal from the location beacon 140).

In some examples, location detection module 112a may determine whether a user has been detected at a particular location at least a threshold number of times. In some examples, the threshold may be one time (e.g., only one visit to a location may be sufficient to generate a geo-fence) or may be a number of times greater than one (e.g., more than one visit may be needed to generate the geo-fence).

Geo-fence generation and control computing platform 110 may further have, store and/or include an authentication module 112b. Authentication module 112b may store instructions and/or data that may cause or enable the geo-fence generation and control computing platform 110 to authenticate a user. For instance, the authentication module 112b may receive an indication that a trusted event was processed. The indication may include data associated with the trusted event (e.g., account or other payment device, amount, parties involved, and the like). This information may be used to determine that a user was authenticated and/or that the trusted event was processed and may indicate that the user, payment methods, RFID data, or the like, is authentic. In some examples, the authentication module 112b may receive authentication data during processing of a trusted event, may compare the authentication data to pre-stored data, and may authenticate the user based on whether the received data matches pre-stored data.

Geo-fence generation and control computing platform 110 may further have, store and/or include a geo-fence generation module 112c. Geo-fence generation module 112c may store instructions and/or data that may cause or enable the geo-fence generation and control computing platform 110 to generate one or more geo-fences based on user data. For instance, based on a user mobile device being detected at a particular location at least a predetermined number of times, and/or a trusted event being processed at a particular location, a geo-fence may be generated. The geo-fence may extend a predetermined distance to enable automatic authentication and authorization of events within the geo-fenced area. In some examples, geo-fence generation module 112c may include instructions and/or data that may cause or enable the geo-fence generation and control computing platform 110 to customize or modify a geo-fence. For instance, a user may activate or deactivate one or more geo-fences, modify a size or shape of a geo-fence, and the like.

Geo-fence generation module 112c may further store instructions and/or data that may cause or enable the geo-fence generation and control computing platform 110 to use machine learning to generate one or more additional geo-fenced areas. For instance, geo-fence generation and control computing platform 110 may have, store and/or include a machine learning engine 112d and machine learning datasets 112e. Machine learning engine 112d and machine learning datasets 112e may store instructions and/or data that may cause or enable geo-fence generation and control computing platform 110 to retrieve data from one or more sources (e.g., remote user computing device 170, remote user computing device 175, external data computing system 145, and the like) to identify behaviors of a user and predict locations at which a geo-fence would benefit a user by providing automatic authentication and/or authorization. For instance, based on, for example, location data from a user's mobile device (e.g., remote user computing device 170) and/or user purchase history (e.g., from external data computing system 145, from internal systems or local user computing device 150, or the like) the machine learning engine 112d may generate predictions associated with locations at which a user is likely to make a purchase (e.g., process a trusted event), secure areas to which the user may require access (e.g., a building having RFID access), and the like. The machine learning datasets 112e may be generated based on analyzed data (e.g., data from previously received data, behavioral data, purchase data, and the like), raw data, and/or received from one or more outside sources.

The machine learning engine 112d may receive data related to one or more users and, using one or more machine learning algorithms, may generate one or more machine learning datasets 112e. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112d may analyze data to identify patterns of activity, sequences of activity, and the like, to generate one or more machine learning datasets 112e.

In some examples, the machine learning datasets 112e may include machine learning data linking one or more patterns of a user to one or more processed trusted events (e.g., location and/or purchase history data may be used to identify shopping patterns for a user (e.g., grocery store followed by home improvement store on Saturday mornings) and this information may be used to generate one or more additional geo-fences that may be interlinked to the first geo-fence generated based on the user data.

FIGS. 2A-2G depict one example illustrative event sequence for implementing and using geo-fence generation and control functions in accordance with one or more aspects described herein. The events shown in the illustrative event sequence are merely one example sequence and additional events may be added, or events may be omitted, without departing from the invention.

Figure 2A:
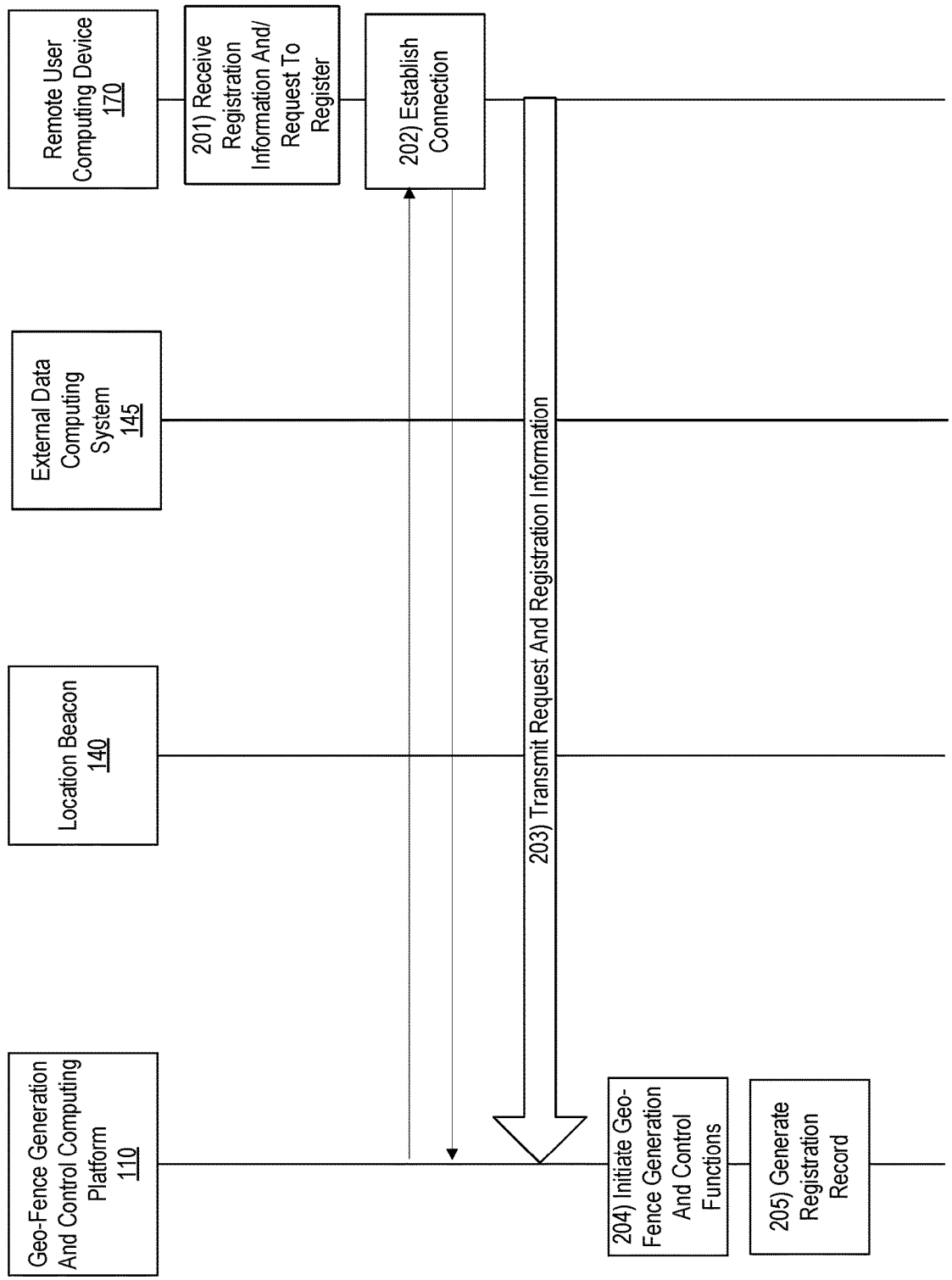

Referring to FIG. 2A, at step 201, registration information and/or a request to register with a system may be received. For instance, a user may input a request for registration into a mobile device, such as remote user computing device 170. In some examples, the request for registration and/or registration information may include information associated with a user, such as user identifying information (e.g., name, birthdate, contact information), user authentication information (e.g., one or more pieces of authenticating information such as usernames and passwords, personal identification number (PIN), biometric data, and the like), account or other form of payment information (e.g., account numbers, card numbers, expiration dates, routing numbers, and the like), and the like. In some examples, the registration information may include user permission information for retrieving data, storing data, processing data, and the like.

At step 202, a connection may be established between the remote user computing device 170 and the geo-fence generation and control computing platform 110. For instance, a first wireless connection may be established between the remote user computing device 170 and the geo-fence generation and control computing platform 110. Upon establishing the first wireless connection, a communication session may be initiated between the remote user computing device 170 and the geo-fence generation and control computing platform 110.

At step 203, the request for registration and/or registration information may be transmitted to the geo-fence generation and control computing platform 110. For instance, the request for registration and/or registration information may be transmitted during the communication session established upon initiating the first wireless connection.

At step 204, the request for registration and/or registration information may be received by the geo-fence generation and control computing platform 110 and processed. Processing the received information may include initiating, activating and/or enabling one or more geo-fence generation and control functions. For instance, features that were previously disabled or inactive may be activated or enabled responsive to receiving the request for registration and/or registration information.

At step 205, a registration record may be generated. For instance, a data structure may be modified to include a new data element associated with the received registration request and/or registration information. The data element may include the received registration information (e.g., user information, payment information, and the like).

Figure 2B:
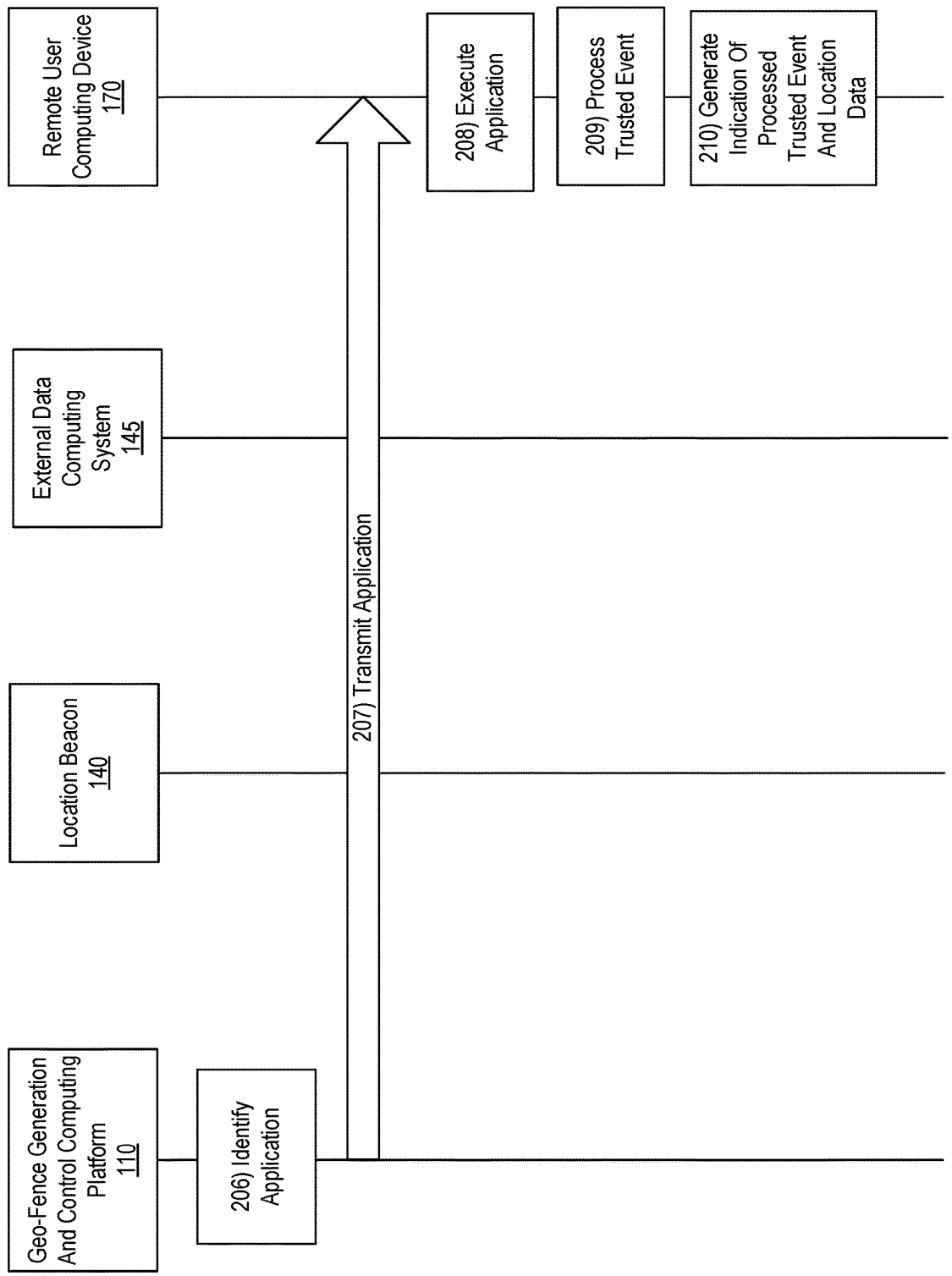

With reference to FIG. 2B, at step 206, an application may be identified by the geo-fence generation and control computing platform 110. The application may be an application to execute on the mobile device of the user (e.g., remote user computing device 170) to capture and transmit data, process data, generate and display user interfaces, and the like.

At step 207, the identified application may be transmitted to the remote user computing device 170. In some examples, the application may be transmitted during the communication session initiated upon establishing the first wireless connection.

At step 208, the application may be received by the remote user computing device 170 and executed by the remote user computing device 170.

At step 209, a trusted event may be processed by, for example, the remote user computing device 170. For instance, a user may make a purchase using a mobile payment application executing on the remote user computing device 170, an online payment service, an automated payment using a payment device or account, or the like.

At step 210, an indication of processing the trusted event may be generated. For instance, trusted event response data may be generated and location data associated with the location of the remote user computing device 170 at a time of the processing may be captured. The location data may be based on GPS data of the remote user computing device 170.

Figure 2C:
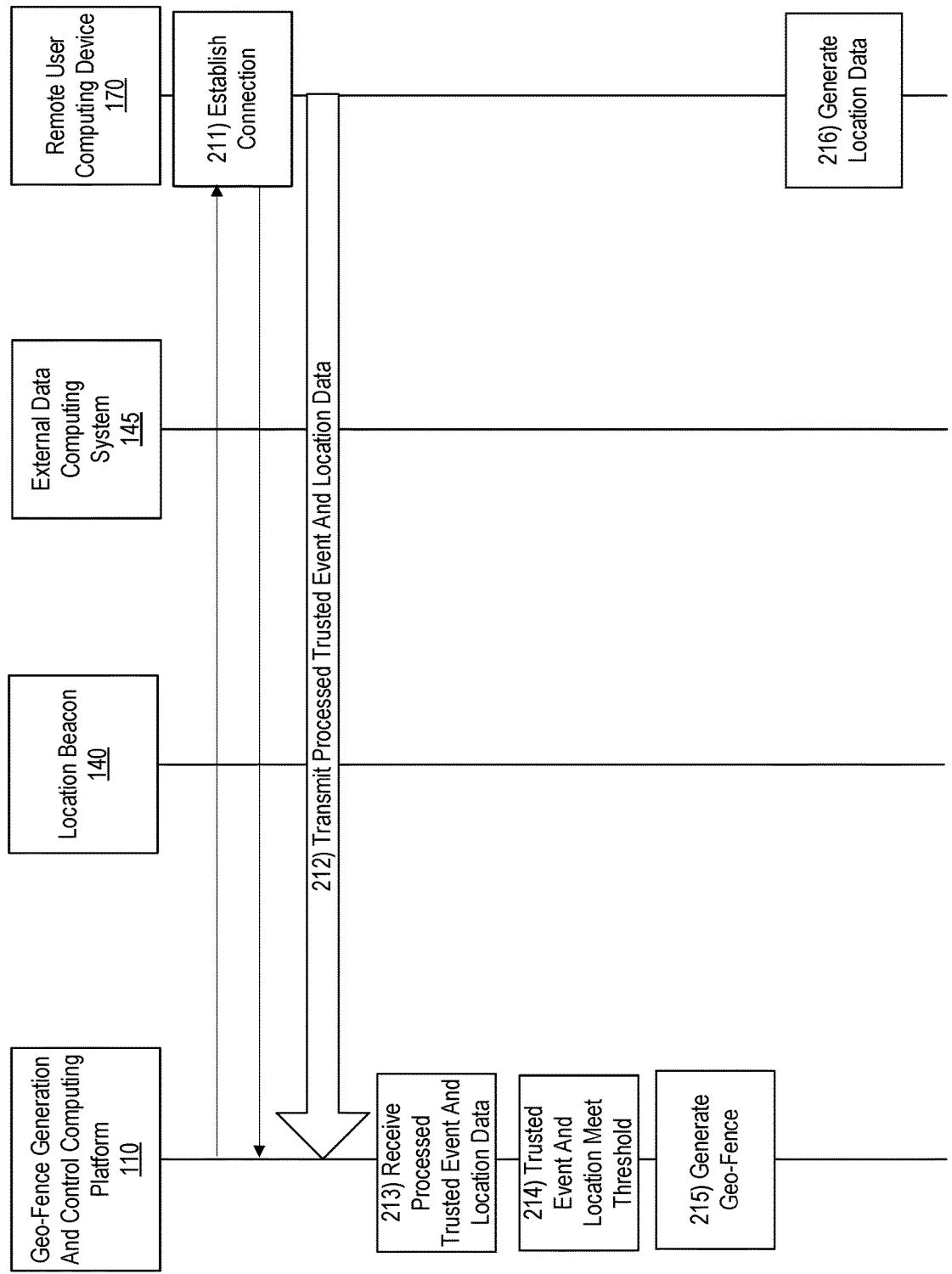
Figure 2D:
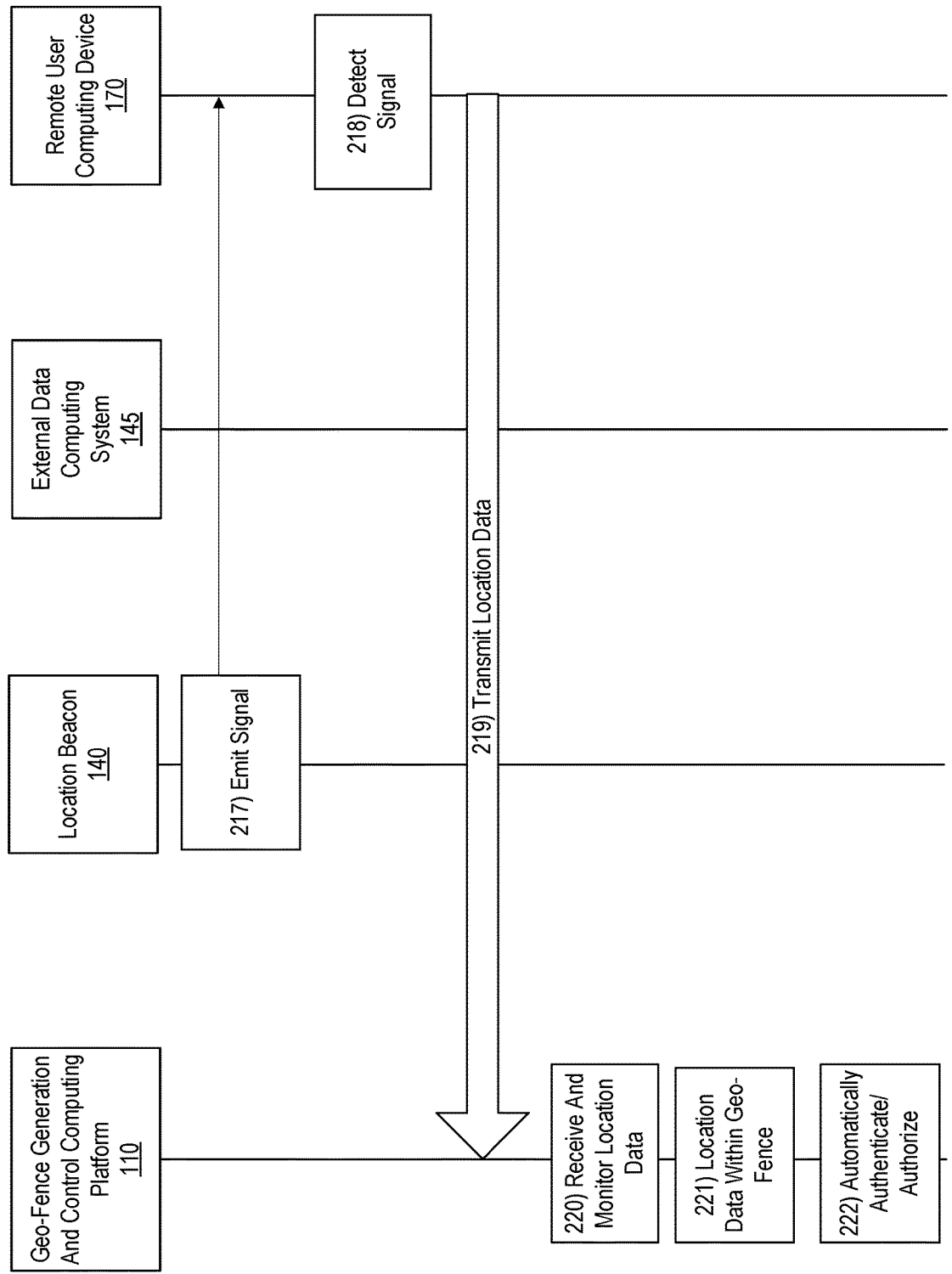

With reference to FIG. 2C, at step 211, a connection may be established between the remote user computing device 170 and the geo-fence generation and control computing platform 110. For instance, a second wireless connection may be established between the remote user computing device 170 and the geo-fence generation and control computing platform 110. Upon establishing the second wireless connection, a communication session may be initiated between the remote user computing device 170 and the geo-fence generation and control computing platform 110. In some arrangements, the second wireless connection may be established after termination of the first wireless connection. In some examples, the first wireless connection may be maintained and, in those cases, step 211 may be optional.

At step 212, the indication of the processed trusted event and the location data may be transmitted from the remote user computing device 170 to the geo-fence generation and control computing platform 110. At step 213, the geo-fence generation and control computing platform 110 may receive the indication of the trusted event and the location data.

At step 214, the received indication of the trusted event and the location data may be processed to determine whether similar trusted events at or near similar locations have been received. For instance, the trusted event (e.g., type, amount, entity, and the like) and/or the location data may be compared to pre-stored trusted event and/or location data (e.g., data captured by the remote user computing device 170 and stored, with permission, by the remote user computing device and/or geo-fence generation and control computing platform 110 (e.g., data transferred from the remote user computing device 170 via the application executing thereon)). If the trusted event data and/or location data match one or more pre-stored events, the geo-fence generation and control computing platform 110 may determine a count or number of trusted events matching and/or locations matching. This count or number may be compared to a predetermined threshold. For instance, the predetermined threshold may be a minimum number of occurrences of the trusted event and/or location before a geo-fence may be generated. In some examples, the threshold may be 1 such that a geo-fence may be generated upon a first occurrence of a trusted event at a particular location. In other examples, the threshold may be more than 1 (e.g., 2, 3, 4, or the like) such that the number of occurrences must meet or exceed the threshold in order to generate a geo-fence.

If the threshold is not met, a geo-fence might not be generated and additional event and/or location data may be captured and analyzed. If the threshold is met, at step 215, a geo-fence may be generated. In some examples, the geo-fence may be generated to include a predetermined distance (e.g., radius) from a point of the location data (e.g., latitude and longitude of location data). In some examples, the geo-fence may be generated to include additional establishments nearby (e.g., large enough to encompass all stores or establishments in a shopping plaza or mall, or the like). In some examples, the geo-fence may include a virtual border surrounding an area identified as a trusted zone. In some arrangements, a user may be automatically authenticated and/or one or more events may be authorized within the trusted zone without requiring additional input from the user (e.g., based on the generated geo-fence).

At step 216, location data may be generated. For instance, remote user computing device 170 may generate location data, such as GPS data, during normal use. For instance, as a user proceeds through his or her day with his or her mobile device (e.g., remote user computing device 170) location data may be captured.

In some examples, one or more location beacons 140 may be used to determine a location of a user and generate location data. For instance, with reference to FIG. 2D, at step 217, a location beacon 140 may emit a signal. At step 218, as remote user computing device 170 is within a predefined range of a location beacon 140, the remote user computing device 170 may detect the signal emitted from the location beacon 140. The signal emitted may be unique to the location beacon 140 and may include an identifier of the location beacon 140 or other information that may be processed to determine a location of the remote user computing device 170 based on proximity to the location beacon 140 having a known location.

At step 219, the location data may be transmitted from the remote user computing device 170 to the geo-fence generation and control computing platform 110. For instance, the geo-fence generation and control computing platform 110 may request and receive location data from the remote user computing device 170 of the user on a continuous basis (e.g., in real-time or near real-time) or on a periodic or aperiodic basis to capture current location data of a user. For instance, as a user proceeds through his or her day with his or her mobile device (e.g., remote user computing device 170) location data may be captured, transmitted to the geo-fence generation and control computing platform 110 (e.g., via the application executing on the mobile device) and analyzed to determine whether the location data matches a location within a generated geo-fence. If so, the user may be automatically authenticated and/or events may be automatically authorized and/or processed. The data may be captured, transmitted and analyzed in real-time to efficiently authenticate users and authorize events.

Additionally or alternatively, the detection of the signal from the location beacon 140 may be transmitted to the geo-fence generation and control computing platform 110 for analysis to determine whether the identified location (e.g., based on the known location of the location beacon) is within a geo-fenced area. If so, the user may be automatically authenticated and/or events may be automatically authorized and processed.

At step 220, the location data may be received and monitored to determine whether the location data indicates that a user is within a generated geo-fenced area. At step 221, the determination may be made as to whether the location data is within the geo-fenced area. If not the process may return to step 220 to monitor location data. If so, at step 222, the user may be automatically authenticated and/or events may be automatically authorized and/or processed. For instance, as a user approaches a secure area requiring RFID authenticate to access, the user may be automatically provided access to the secure area without requiring RFID authentication (e.g., without requiring an RFID tag to be placed within proximity of an RFID reader). For instance, the geo-fence generation and control computing platform may transmit a signal indicating that the user is authenticated in order to provide access to the user.

In another example, as a user approaches a point-of-sale system to make a purchase or process a trusted event, the event may be automatically authorized and processed without requiring user input from the user (e.g., swipe of card, insert of card, tap of device, or the like).

With reference to FIG. 2E, at step 223, additional location data may be generated. For instance, as discussed above, location data may be generated via GPS on a user's mobile device (e.g., remote user computing device 170), by proximity to location beacons, and the like. In some examples, the location data may be data generated by movement of the user subsequent to generation of the first geo-fence.

At step 224, the additional location data may be transmitted to the geo-fence generation and control computing platform 110.

At step 225, the additional location data may be received by the geo-fence generation and control computing platform 110.

At step 226, a request for additional user information may be generated. For instance, a request for user purchase history data, internet browsing history, and the like, may be generated.

At step 227, a connection may be established between the geo-fence generation and control computing platform 110 and one or more external data computing systems, such as external data computing system 145. For instance, a third wireless connection may be established between the geo-fence generation and control computing platform 110 and the external data computing system 145. Upon establishing the third wireless connection, a communication session may be initiated between the geo-fence generation and control computing platform 110 and the external data computing system 145.

Figure 2F:
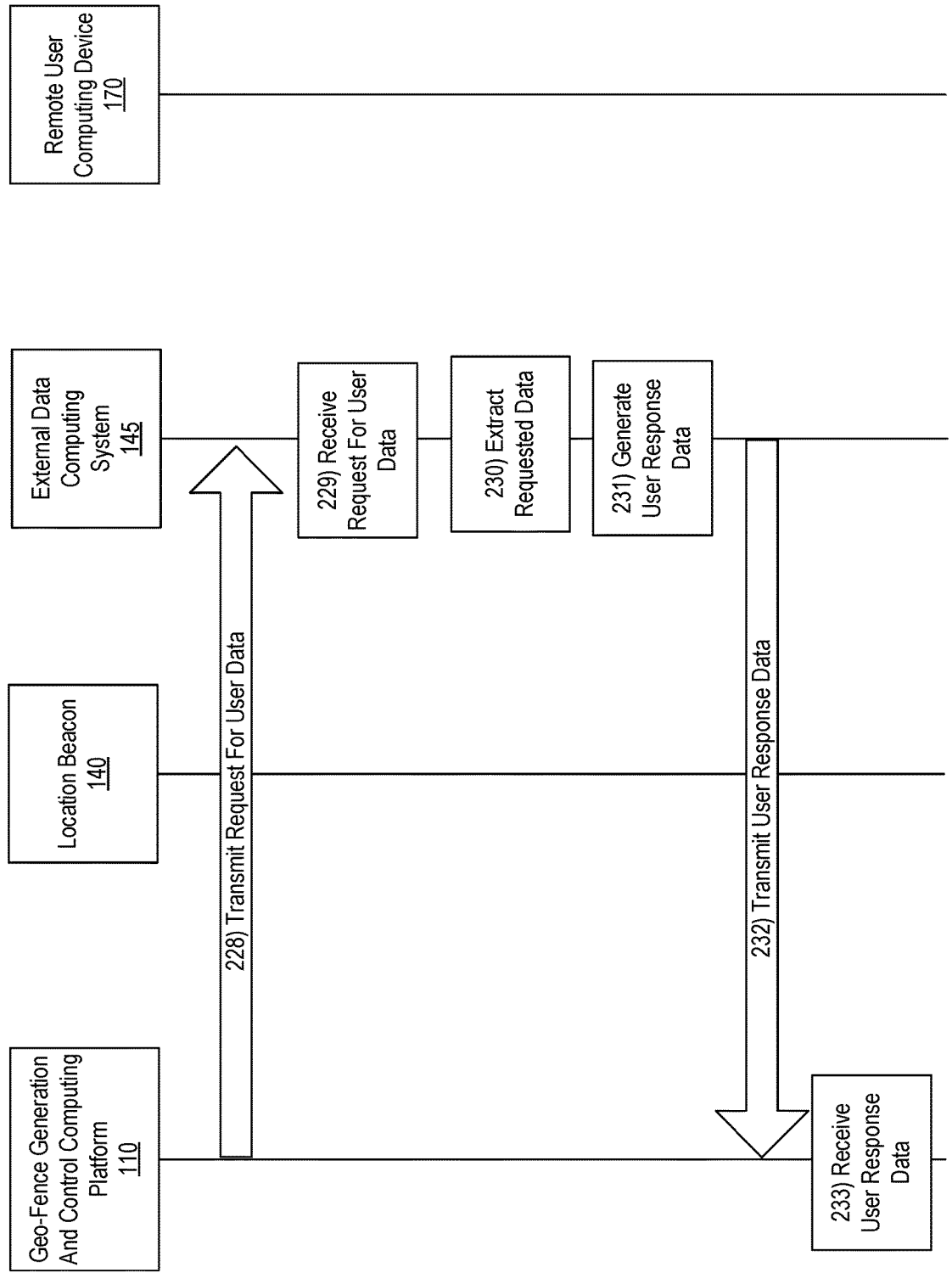

With reference to FIG. 2F, at step 228, the generated request for additional user data may be transmitted from the geo-fence generation and control computing platform 110 to the external data computing system 145. In some examples, the generated request may be transmitted during the communication session initiated upon establishing the third wireless connection.

At step 229, the request for user data may be received by the external data computing system 145 and, at step 230, the requested data may be extracted from one or more databases.

At step 231, user response data may be generated based on the extracted data. At step 232, the user response data may be transmitted to the geo-fence generation and control computing platform 110.

At step 233, the user response data may be received by the geo-fence generation and control computing platform 110.

With reference to FIG. 2G, at step 234, the received additional location data and user data may be processed. For instance, the data may be formatted, aggregated, and the like.

At step 235, based on the additional location data and user data, machine learning may be used to predict a location for one or more subsequent geo-fences. For instance, based on the user's movement as determined from the additional location data, as well as other user behaviors, as determined from the user response data, one or more machine learning datasets may be used to determine a location for one or more second or subsequent geo-fence within which a user may be automatically authenticated and/or events may be automatically authorized and/or processed. The additional geo-fence locations may be adjacent to one or more other geo-fence locations or might not be near an existing geo-fence location.

At step 236, a second or subsequent geo-fence may be generated. For instance, a second or subsequent geo-fence may be generated at, around or near the one or more locations predicted at step 235.

At step 237, the generated second or subsequent geo-fence may be interlined with the first geo-fence (or other) geo-fences generated for the user. For instance, all geo-fences for a particular user, couple, family, group, or the like, may be interlinked to share data between and improve efficiency of authentication and authorization.

In some examples, a user may control the one or more interlinked geo-fences, such as via the application executing on the mobile device. For instance, a user may desire to activate or deactivate one or more interlinked geo-fences in anticipation of being in an area, not being in an area, and the like. Accordingly, the user may control when and/or how the user is authenticated and/or events are authorized or processed, e.g., via the application.

Figure 3:
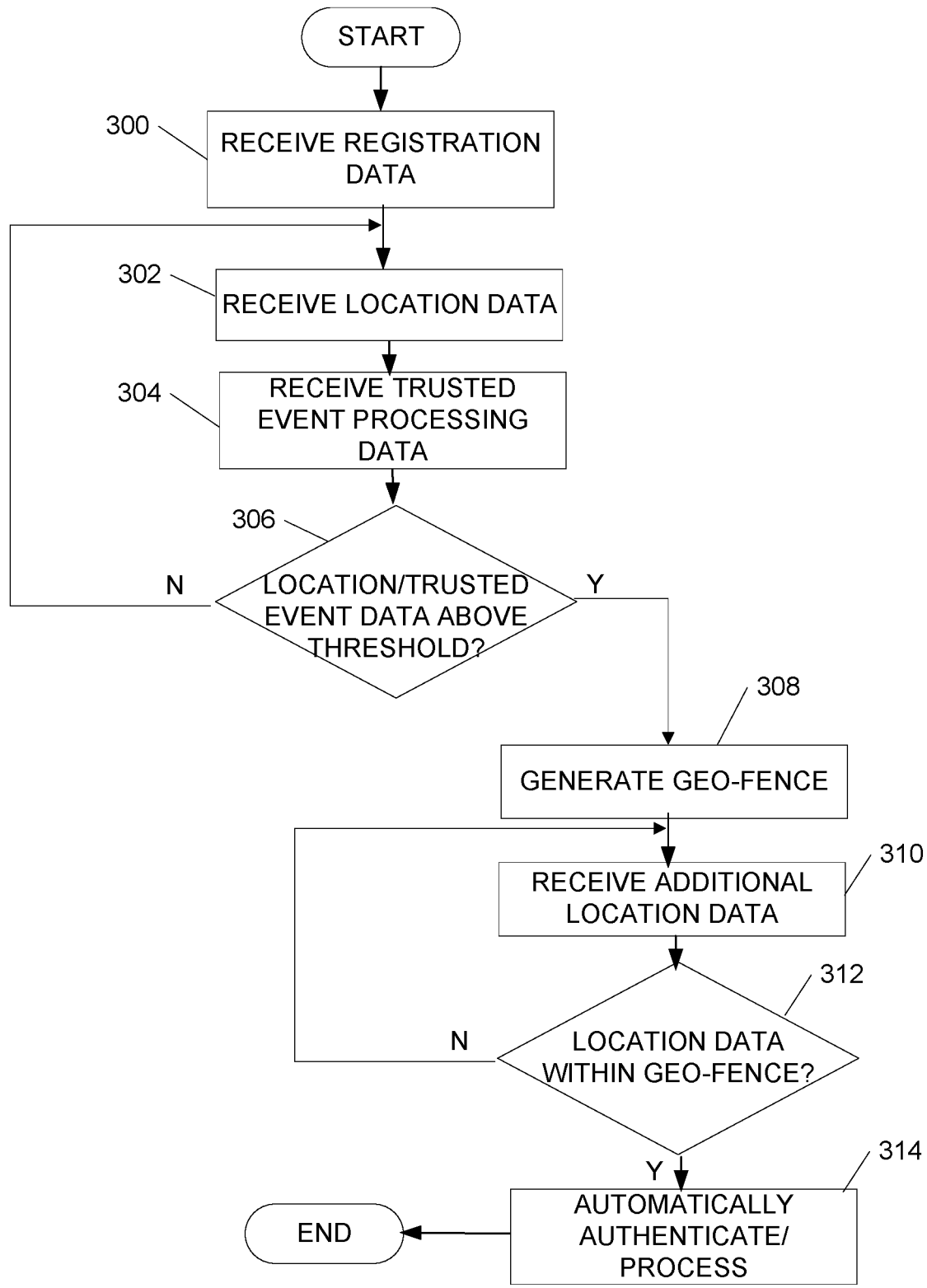
FIG. 3 depicts an illustrative method for implementing and using geo-fence generation and control functions according to one or more aspects described herein.

FIG. 3 is a flow chart illustrating one example method of geo-fence generation and control according to one or more aspects described herein. The processes illustrated in FIG. 3 are merely some example processes and functions. The steps shown may be performed in the order shown, in a different order, more steps may be added, or one or more steps may be omitted, without departing from the invention.

At step 300, registration data may be received. As discussed herein, registration data may include user information (name, contact information, and the like), user device information (international mobile equipment identity (IMEI)), payment information (e.g., device number, account number, and the like), and the like. Responsive to receiving the registration data, a new record may be generated and a data structure may be modified to include the new record.

At step 302, location data may be received from a mobile device of a user, such as remote user computing device 170. In some examples, the location data may include GPS data captured by the remote user computing device 170. Additionally or alternatively, location data may include an indication of detection of a signal emitted from a location beacon, such as location beacon 140, having a known location. In some examples, the location data may be associated with a location of the remote user computing device 170 at a first time.

At step 304, trusted event processing data may be received. For instance, an indication that a trusted event was successfully processed, payment information, entity information, and the like, may be received. In some examples, the trusted event processing data may be transmitted from the remote user computing device 170. In some examples, the trusted event processing data may include a time stamp and/or an indication that the trusted event was processed at the first time or within a predetermined time (e.g., 30 seconds, 5 minutes, 10 minutes, or the like) of the first time. In some examples, the trusted event processing data may include the location data such that both items are transmitted together.

At step 306, a determination may be made as to whether the location data and trusted event processing data is above a threshold number of occurrences of the same or similar location data and/or trusted event processing data. For instance, the geo-fence generation and control computing platform 110 may determine a number of occurrences of the location data and trusted event processing data stored. In some examples, the location data and trusted event processing data may be compared to previously stored location data and trusted event processing data (e.g., from previously received data) to determine whether the location data and/or trusted event processing data matches previously stored data. The system may then determine a number of occurrences of the location data and trusted event processing data (e.g., one if no match occurs, more than one if at least one match occurs). The number of occurrences may then be compared to a threshold. In some examples, the threshold may be one (e.g., a single occurrence of the location data and trusted event processing data is sufficient). In other examples, the threshold may be more than one. In some arrangements, the user may customize the threshold.

If the location data and trusted event processing data is not greater than the threshold at step 306, the location data and trusted event processing data may be stored and the process may return to step 302 to receive additional data.

If, at step 306, the number of occurrences of the location data and trusted event processing data is at or greater than the threshold, at step 308, a geo-fence may be generated. In some examples, the geo-fence may surround or encompass an area associated with the location data. The geo-fence may extend in multiple directions out from a location of the location data (e.g., longitude and latitude coordinates) a predetermined distance (e.g., radius, number of feet, yards or miles, number of meters, or the like).

At step 310, additional data may be received after generation of the geo-fence. In some examples, the data may include location data associated with a location of the mobile device at a second time after or subsequent to the first time and may be GPS data received from the remote user computing device 170 and/or may include location data based on one or more location beacons, such as location beacon 140.

In some examples, the additional data may include requests for customization options of a generated geo-fence. For instance, additional data may include activation or deactivation of a geo-fence, modification of a size of a geo-fence, and the like.

At step 312, a determination may be made as to whether the received additional data includes a location within the generated geo-fence. If not, the process may return to step 310. If the location is within the generated geo-fence, the user may be automatically authenticated and/or one or more events may be automatically authorized and/or processed based on the generated geo-fence.

Figure 4:
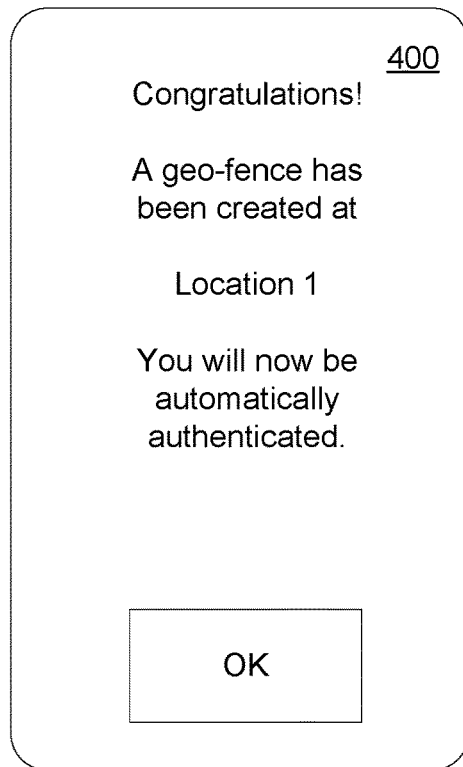
FIGS. 4 and 5 illustrates example user interfaces that may be generated and displayed in accordance with one or more aspects described herein.

FIG. 4 illustrates one example user interface that may be generated and displayed (e.g., via the application executing on the mobile device) on the mobile device (e.g., remote user computing device 170) of the user in accordance with one or more aspects described herein. The user interface 400 includes an indication that a geo-fence has been created for the user. It also includes an indication of the geo-fence location.

Figure 5:
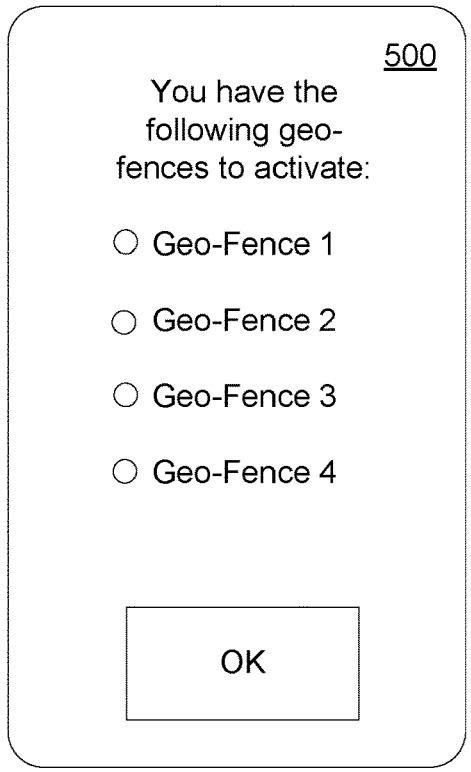

FIG. 5 illustrates another example user interface that may be generated and displayed (e.g., via the application executing on the mobile device) on the mobile device (e.g., remote user computing device 170) of the user in accordance with one or more aspects described herein. The user interface 500 includes a listing of a plurality of previously generated geo-fences. Each geo-fence listed includes a radio button which the user can select or deselect to activate or deactivate the particular geo-fence. Accordingly, the user may customize which geo-fences are activated and/or not activated as desired.

Aspects described herein are directed to generating one or more geo-fences to be used to authenticate a user, authorize event processing, and the like. As discussed herein, established geo-fence locations, areas or zones may enable automatic authentication or authorization that, in some examples, would not require any additional user input (e.g., PIN, password, card swipe, device tap, or the like).

As discussed herein, one or more geo-fences may be generated based on user location data (e.g., determined from GPS from a mobile device of a user, from one or more location beacons emitting a signal detected by the mobile device of the user, or the like). In some examples, a user may be able to request generation of a geo-fence (e.g., via the application executing on the mobile device). For instance, if a user expects to be running several errands in a particular day, the user may request generation of a geo-fence surrounding the area of the errands, to enable automatic authentication and/or authorization.

In some examples, generated geo-fences may include a plurality of location beacons distributed throughout an area (e.g., in or around a retail establishment, in or around a school, hospital, playground, or the like). In some examples, generation of a geo-fence may be based on data from one or more location beacon. Additionally or alternatively, automatic authentication or authorization of the user may be based on the location beacons. For example, when a signal emitted from a location beacon is detected by a mobile device of the user, the user may be automatically authenticated based on the established geo-fence.

In some examples, the beacons may be radius based (e.g., a signal is emitted and if within a predetermined distance of the beacon, the mobile device may detect the signal). In other examples, beacon triangulation may be used such that more than one beacon is used to determine location.

In addition to or in lieu of the location beacons, one or more systems within a building or area may be enabled or configured to detect a mobile device, emit a signal available for detection by a mobile device, or the like.

In some examples, a geo-fence may have a predetermined size or range (e.g., a radius of 5 feet, a radius of 100 yards, or the like). In some arrangements, the size or range of the geo-fence may be adjustable or customizable (e.g., via the application executing on the mobile device of the user). For instance, a user may have a geo-fence having a smaller radius when using the geo-fence to, for example, permit access to a secure location.

In some examples, one or more geo-fences may be configured to automatically collapse or deactivate upon detection of a triggering event. For instance, upon a detection of a user at a home location (e.g., based on mobile device data, location beacon data, or the like), in some examples, some or all of the geo-fences may be deactivated, collapsed or, in some examples, deleted.

In some examples, generation of a geo-fence at one particular retail entity or type of retail entity may cause generation of a geo-fence at another location of the particular retail entity. For instance, if a user frequently visits Store A at location 1, a geo-fence may be generated surrounding location 1 of Store A. In some examples, a geo-fence may also be generated for location 2 of Store A, such that the user may be automatically authenticated or events authorized at more than one location of the store.

In some examples, a geo-fence may be used as one of a plurality of methods of authentication. For instance, in arrangements requiring multi-factor authentication, a generated geo-fence may provide one factor of authentication. A user may, in those examples, provide additional authentication data.

In some examples, geo-fences may be dynamically generated as a user moves about. For instance, if a user has an established pattern of behavior (e.g., drives to work, goes out to lunch, goes home, or the like), geo-fences may be dynamically generated as the user moves through his or her day. For instance, a geo-fence may be dynamically generated at the workplaces to provide access to a building or secure area. Another geo-fence may be generated at noon to provide efficient event processing of a lunch purchase, and the like. In some examples, the geo-fence may be temporary (e.g., lunch location) or permanent (e.g., workplace access).

Accordingly, as discussed herein, geo-fences may be enabled or activated and disabled or deactivated as desired by the user. In some examples, the geo-fence may be generated for a predetermined time period and, at expiration of the time period, the geo-fence may be deleted. In some examples, a geo-fence may be sold or transferred to another user (e.g., via a marketplace managed via the application executing on the mobile device). In some examples, a sale or transfer of a geo-fence may be for a predetermined, temporary time period or may be a permanent transfer. For instance, a user may desire to temporarily transfer a geo-fence to a child, spouse, friend, or the like, to enable efficient authorization and authentication. In those arrangements, a mobile device of the recipient of the geo-fence may be registered with the system to facilitate location detection, authentication, and the like.

In some examples, the geo-fence may be used to track users or devices within the geo-fence. For instance, a user may desire to monitor movement of his or her child. Accordingly, the child may have a mobile device, RFID tag, or the like, that may be detected via, for example, one or more location beacons, RFID readers, or the like, as the child moves within the geo-fence (e.g., check-in points). If the user moves beyond the border of the geo-fence, a notification may be transmitted to the user device indicating that the child has moved outside the geo-fenced area. In some examples, devices may be applied to a child's clothes, shoes, backpack or other bag, and the like, to facilitate parent tracking of the child.

As discussed herein, machine learning may be used to predict desirable locations for geo-fences and geo-fences may be generated at those locations. In some examples, the predicted locations may be based on user behaviors, user interests, social media connections, and the like. Data to predict the various locations may be accessed and analyzed with the permission of the user to identify potential additional locations for geo-fencing.

Although various arrangements described herein relate to location beacons emitting a signal detected by a mobile device, in some examples, a location beacon may be configured to detect a signal emitted by another device, such as a mobile device, RFID tag, other tracking device, or the like. Accordingly, as a device is detected, the location beacon may transmit a signal to the geo-fence generation and control computing platform 110 to generate a geo-fence, authenticate a user, authorize an event, or the like.

As discussed herein, generated geo-fences may be interlinked to enable sharing of data, strengthening of machine learning datasets (e.g., via validation or updating based on later received data) and the like. Interlinked geo-fences may further enable a broader range of authentication for a user.

The above-described examples and arrangements are merely some example arrangements in which the systems described herein may be used. Various other arrangements employing aspects described herein may be used without departing from the invention.

Figure 6:
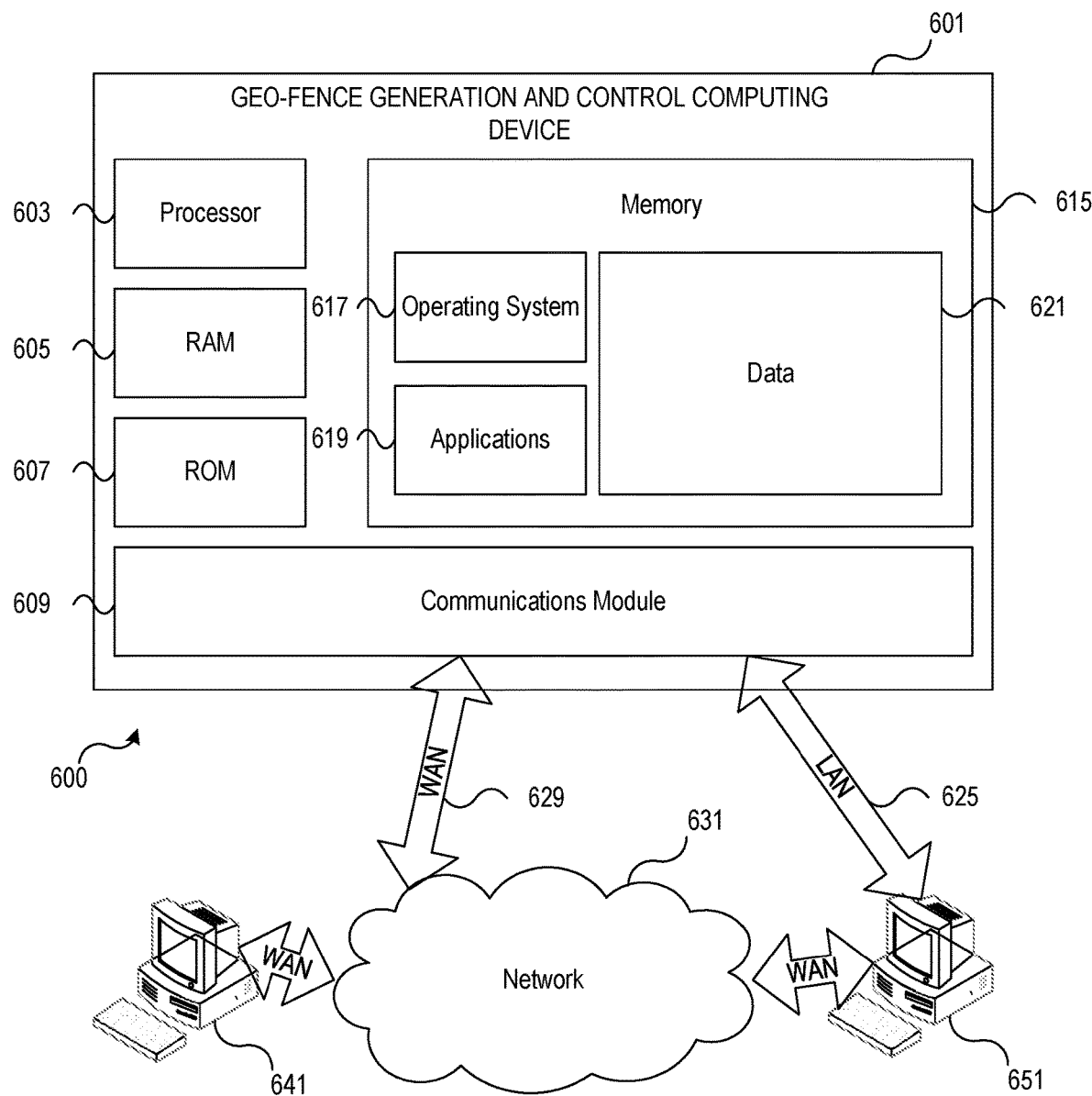
FIG. 6 illustrates one example operating environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include geo-fence generation and control computing device 601 having processor 603 for controlling overall operation of geo-fence generation and control computing device 601 and its associated components, including Random Access Memory (RAM) 605, Read-Only Memory (ROM) 607, communications module 609, and memory 615. Geo-fence generation and control computing device 601 may include a variety of computer readable media. Computer readable media may be any available media that may be accessed by geo-fence generation and control computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on geo-fence generation and control computing device 601. Such a processor may execute computer-executable instructions stored on a computer-readable medium.

Software may be stored within memory 615 and/or storage to provide instructions to processor 603 for enabling geo-fence generation and control computing device 601 to perform various functions as discussed herein. For example, memory 615 may store software used by geo-fence generation and control computing device 601, such as operating system 617, application programs 619, and associated database 621. Also, some or all of the computer executable instructions for geo-fence generation and control computing device 601 may be embodied in hardware or firmware. Although not shown, RAM 605 may include one or more applications representing the application data stored in RAM 605 while geo-fence generation and control computing device 601 is on and corresponding software applications (e.g., software tasks) are running on geo-fence generation and control computing device 601.

Communications module 609 may include a microphone, keypad, touch screen, and/or stylus through which a user of geo-fence generation and control computing device 601 may provide input, and may also include one or more of a speaker for providing audio output and a video display device for providing textual, audiovisual and/or graphical output. Computing system environment 600 may also include optical scanners (not shown).

Geo-fence generation and control computing device 601 may operate in a networked environment supporting connections to one or more remote computing devices, such as computing devices 641 and 651. Computing devices 641 and 651 may be personal computing devices or servers that include any or all of the elements described above relative to geo-fence generation and control computing device 601.

The network connections depicted in FIG. 6 may include Local Area Network (LAN) 625 and Wide Area Network (WAN) 629, as well as other networks. When used in a LAN networking environment, geo-fence generation and control computing device 601 may be connected to LAN 625 through a network interface or adapter in communications module 609. When used in a WAN networking environment, geo-fence generation and control computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 7:
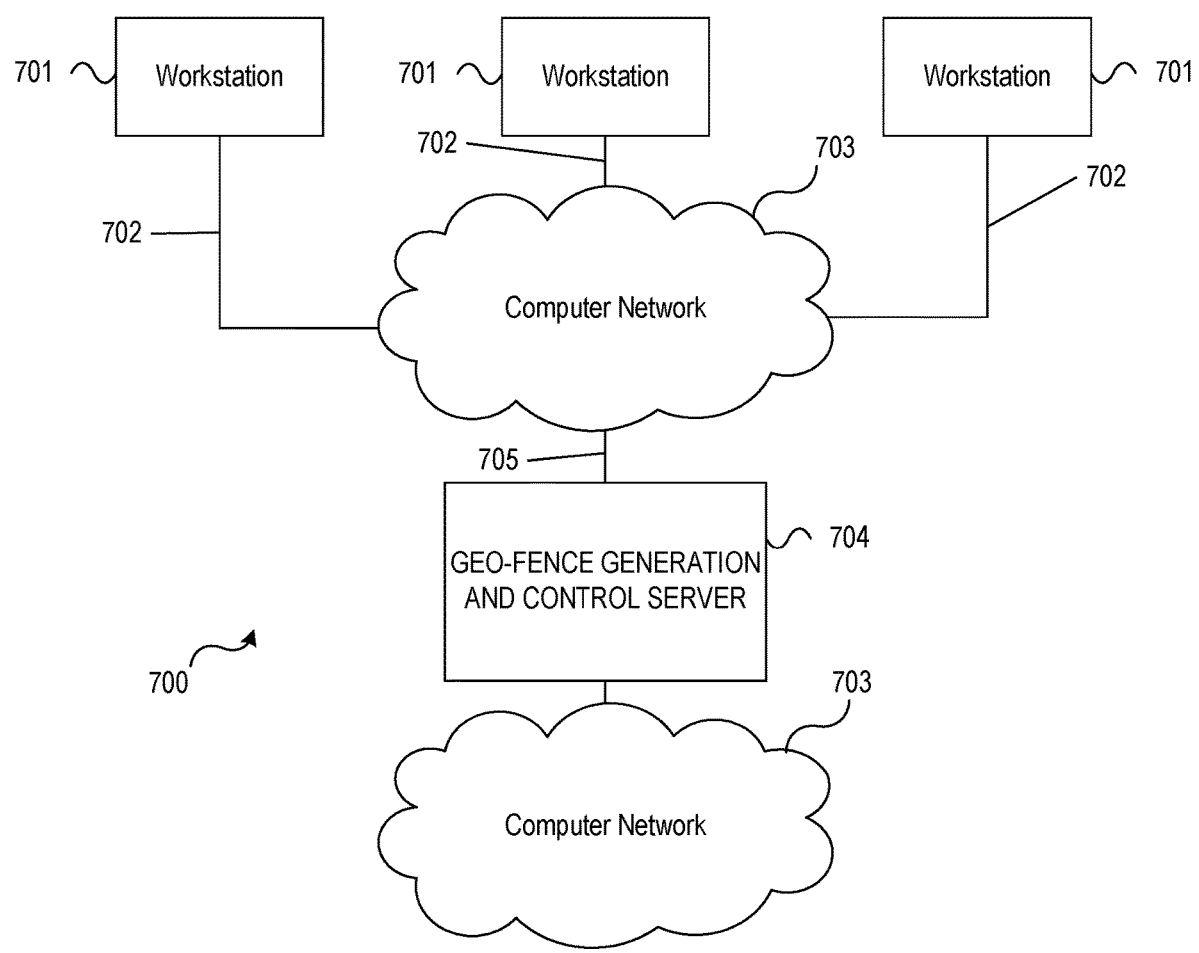
FIG. 7 depicts an illustrative block diagram of workstations and servers that may be used to implement the processes and functions of certain aspects of the present disclosure in accordance with one or more aspects described herein.

FIG. 7 depicts an illustrative block diagram of workstations and servers that may be used to implement the processes and functions of certain aspects of the present disclosure in accordance with one or more example embodiments. Referring to FIG. 7, illustrative system 700 may be used for implementing example embodiments according to the present disclosure. As illustrated, system 700 may include one or more workstation computers 701. Workstation 701 may be, for example, a desktop computer, a smartphone, a wireless device, a tablet computer, a laptop computer, and the like, configured to perform various processes described herein. Workstations 701 may be local or remote, and may be connected by one of communications links 702 to computer network 703 that is linked via communications link 705 to geo-fence generation and control server 704. In system 700, geo-fence generation and control server 704 may be a server, processor, computer, or data processing device, or combination of the same, configured to perform the functions and/or processes described herein. Server 704 may be used to receive requests for registration and/or registration information, receive location data, receive trusted event processing data, generate a geo-fence, using machine learning, predict a location of a second geo-fence, and the like.

Computer network 703 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 702 and 705 may be communications links suitable for communicating between workstations 701 and geo-fence generation and control server 704, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
    at least one processor;
    a communication interface communicatively coupled to the at least one processor; and
    memory storing computer-readable instructions that, when executed by the at least one processor, cause the computing platform to:
        receive, from a mobile device of a user, a request to generate a first geo-fenced area, the first geo-fenced area including a virtual border surrounding an area identified as a trusted zone;
        generate the first geo-fenced area having a predetermined size, wherein the predetermined size and a shape of the first geo-fenced area are adjustable by a user via an application executing on the mobile device of the user, wherein the first geo-fenced area includes a first geographic location of a first retail entity;
        generate, based on the generated first geo-fenced area, a second geo-fenced area including a second geographic location of the first retail entity, wherein the user may be automatically authenticated in the second geo-fenced area;
        receive, from the mobile device of the user, first location data associated with a location of the mobile device within the first geo-fenced area; and
        automatically perform at least one of: authenticating the user and authorizing processing a requested event, based on the first location data including the location of the mobile device within the first geo-fenced area.

2. The computing platform of claim 1, further including instructions that, when executed, cause the computing platform to:
after automatically performing at least one of: authenticating the user and authorizing processing a requested event, based on the first location data including the location within the first geo-fenced area, receive a request to deactivate the first geo-fenced area; and
deactivate the first geo-fenced area in response to the request.

3. The computing platform of claim 1, wherein the first location data associated with the location of the mobile device is based on global positioning system (GPS) data from the mobile device.

4. The computing platform of claim 1, wherein the first location data associated with the location of the mobile device is based on a signal emitted from a location beacon having a known location.

5. The computing platform of claim 1, further including instructions that, when executed, cause the computing platform to:
receive additional location data associated with the mobile device of the user;
receive additional user data associated with the user;
based on the received additional location data and the received additional user data, and using machine learning, predict a location for a third geo-fenced area; and
generate the third geo-fenced area.

6. The computing platform of claim 1, further including instructions that, when executed, cause the computing platform to:
interlink the first geo-fenced area and the second geo-fenced area.

7. The computing platform of claim 1, further including instructions that, when executed, cause the computing platform to:
receive registration information from the user; and
responsive to receiving the registration information from the user, transmit an application to the mobile device of the user for execution on the mobile device of the user.

8. The computing platform of claim 1, further including instructions that, when executed, cause the computing platform to:
detect the mobile device of the user at a home location; and
responsive to detecting the mobile device of the user at the home location, deactivate the first geo-fenced area.

9. A method, comprising:
by a computing platform comprising at least one processor, memory, and a communication interface:
receiving, by the at least one processor and from a mobile device of a user, a request to generate a first geo-fenced area, the first geo-fenced area including a virtual border surrounding an area identified as a trusted zone;
generating, by the at least one processor, the first geo-fenced area having a predetermined size, wherein the predetermined size and a shape of the first geo-fenced area are adjustable by a user via an application executing on the mobile device of the user, wherein the first geo-fenced area includes a first geographic location of a first retail entity;
generating, by the at least one processor and based on the generated first geo-fenced area, a second geo-fenced area including a second geographic location of the first retail entity, wherein the user may be automatically authenticated in the second geo-fenced area;
receiving, by the at least one processor and from the mobile device of the user, first location data associated with a location of the mobile device within the first geo-fenced area; and
automatically performing, by the at least one processor, at least one of: authenticating the user and authorizing processing a requested event, based on the first location data including the location of the mobile device within the first geo-fenced area.

10. The method of claim 9, further including:
after automatically performing at least one of: authenticating the user and authorizing processing a requested event, based on the first location data including the location within the first geo-fenced area, receiving, by the at least one processor, a request to deactivate the first geo-fenced area; and
deactivating, by the at least one processor, the first geo-fenced area in response to the request.

11. The method of claim 9, wherein the first location data associated with the location of the mobile device is based on global positioning system (GPS) data from the mobile device.

12. The method of claim 9, wherein the first location data associated with the location of the mobile device is based on a signal emitted from a location beacon having a known location.

13. The method of claim 9, further including:
receiving, by the at least one processor and via the communication interface, additional location data associated with the mobile device of the user;
receiving, by the at least one processor and via the communication interface, additional user data associated with the user;
based on the received additional location data and the received additional user data, and using machine learning, predicting, by the at least one processor, a location for a third geo-fenced area; and
generating, by the at least one processor, the third geo-fenced area.

14. The method of claim 9, further including:
interlinking, by the at least one processor, the first geo-fenced area and the second geo-fenced area.

15. The method of claim 9, further including:
receiving, by the at least one processor, registration information from the user; and
responsive to receiving the registration information from the user, transmitting, by the at least one processor and via the communication interface, an application to the mobile device of the user for execution on the mobile device of the user.

16. One or more non-transitory computer-readable media storing instructions that, when executed by a computing platform comprising at least one processor, memory, and a communication interface, cause the computing platform to:
receive, from a mobile device of a user, a request to generate a first geo-fenced area, the first geo-fenced area including a virtual border surrounding an area identified as a trusted zone;
generate the first geo-fenced area having a predetermined size, wherein the predetermined size and a shape of the first geo-fenced area are adjustable by a user via an application executing on the mobile device of the user, wherein the first geo-fenced area includes a first geographic location of a first retail entity;
generate, based on the generated first geo-fenced area, a second geo-fenced area including a second geographic location of the first retail entity, wherein the user may be automatically authenticated in the second geo-fenced area;
receive, from the mobile device of the user, first location data associated with a location of the mobile device within the first geo-fenced area; and
automatically perform at least one of: authenticating the user and authorizing processing a requested event, based on the first location data including the location of the mobile device within the first geo-fenced area.

17. The one or more non-transitory computer-readable media of claim 16, further including instructions that, when executed, cause the computing platform to:
after automatically performing at least one of: authenticating the user and authorizing processing a requested event, based on the first location data including the location within the first geo-fenced area, receive a request to deactivate the first geo-fenced area; and
deactivate the first geo-fenced area in response to the request.

18. The one or more non-transitory computer-readable media of claim 16, wherein the first location data associated with the location of the mobile device is based on a signal emitted from a location beacon having a known location.

19. The one or more non-transitory computer-readable media of claim 16, further including instructions that, when executed, cause the computing platform to:
receive additional location data associated with the mobile device of the user;
receive additional user data associated with the user;
based on the received additional location data and the received additional user data, and using machine learning, predict a location for a third geo-fenced area; and
generate the third geo-fenced area.

20. The one or more non-transitory computer-readable media of claim 16, further including instructions that, when executed, cause the computing platform to:
interlink the first geo-fenced area and the second geo-fenced area.

21. The one or more non-transitory computer-readable media of claim 16, further including instructions that, when executed, cause the computing platform to:
receive registration information from the user; and
responsive to receiving the registration information from the user, transmit an application to the mobile device of the user for execution on the mobile device of the user.

\* \* \* \* \*